INVENTOR
John T. Shields and
Marshall P. Miller
By Herbert A. Minturn
ATTORNEY

March 18, 1958 J. T. SHIELDS ET AL 2,827,196
MILK CRATE PARTITION

Filed July 28, 1955 4 Sheets-Sheet 2

INVENTOR
John T. Shields and
Marshall P. Miller
By Herbert A. Minturn,
ATTORNEY

March 18, 1958    J. T. SHIELDS ET AL    2,827,196
MILK CRATE PARTITION
Filed July 28, 1955    4 Sheets-Sheet 3
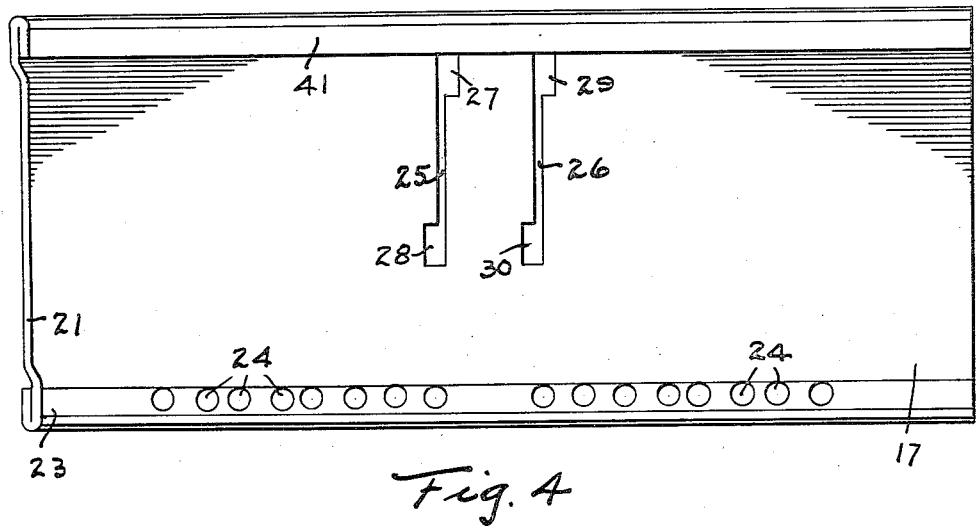
Fig. 4
Fig. 6
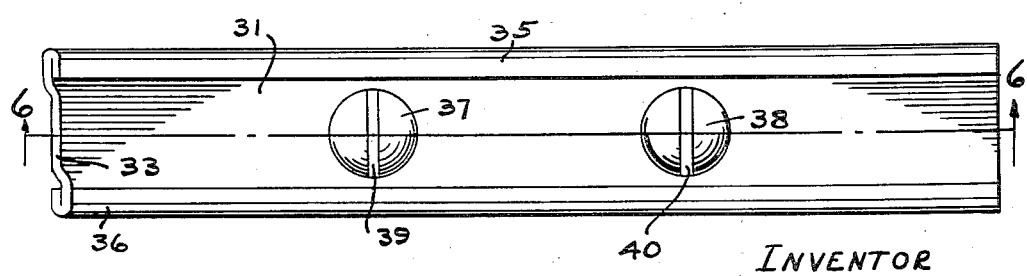
Fig. 5
INVENTOR
John T. Shields and
Marshall P. Miller
By Herbert A. Minturn
ATTORNEY March 18, 1958 J. T. SHIELDS ET AL 2,827,196
MILK CRATE PARTITION
Filed July 28, 1955 4 Sheets-Sheet 4
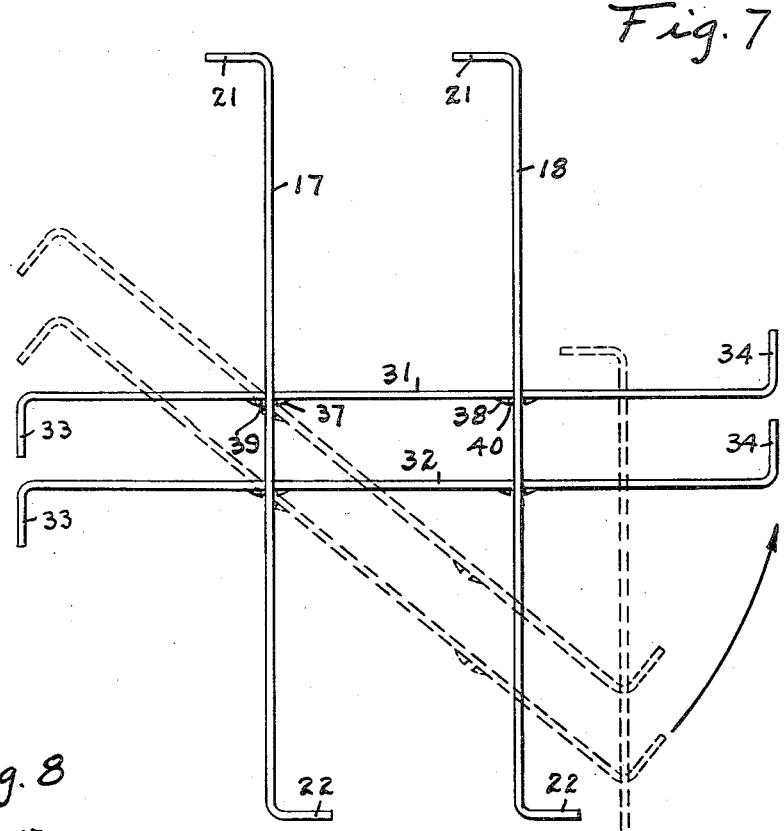
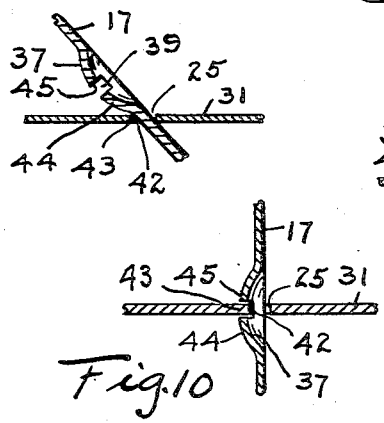
INVENTOR
John T. Shields and
Marshall P. Miller
By Herbert A. Mintury
ATTORNEY United States Patent Office 2,827,196
Patented Mar. 18, 1958

2,827,196

MILK CRATE PARTITION

John T. Shields and Marshall P. Miller, Bedford, Ind., assignors to Stone City Machine and Tool Company, Inc., Bedford, Ind., a corporation of Indiana Application July 28, 1955, Serial No. 524,959

2 Claims. (Cl. 220—21)

This invention relates to a construction for interlocking centrally partitions employed in milk crates in order to hold apart milk bottles or cartons to be carried in the crate. The invention embodies a simplified structure whereby the crossing partitions are inserted one through the other and by a snap action secured in fixed positions.

A primary object of the invention is to provide an exceedingly simplified yet most durable structure wherein the partitions will remain fixed in positions at their intersections all in the absence of riveting or welding, and will retain those crossed positions throughout the lifetime of the crate.

A further important object of the invention is to construct a milk crate with partitions in a minimum number of operations in assembly in order to permit a lower cost of manufacturing as compared to the heretofore employed structures.

A still further important object of the invention is to provide a sanitary construction which may be readily washed and sterilized when necessary all in the absence of any closed pockets or welded joints at the intersections of the crossed partitions.

These and many other objects and advantages of the invention will becomes apparent to those versed in the art in the following description of one particular form of the invention as illustrated by the accompanying drawings, in which:

Fig. 4 is a view in side elevation of one of the wider partitions employed;

Fig. 5 is a view in side elevation of one of the narrower partitions employed;

Fig. 6 is a view in transverse section on the line 6—6 in Fig. 5;

Fig. 7 is a view in top plan of the partitions separate from the milk crate;

Fig. 8 is a view in transverse section in detail of a No. 1 step in the interengaging of the partitions;

Fig. 9 is a similar view in section in detail of a second step in the assembly of the partitions; and Fig. 10 is a view in section in detail of a third step showing the interlocked partitions.

Figure 1:
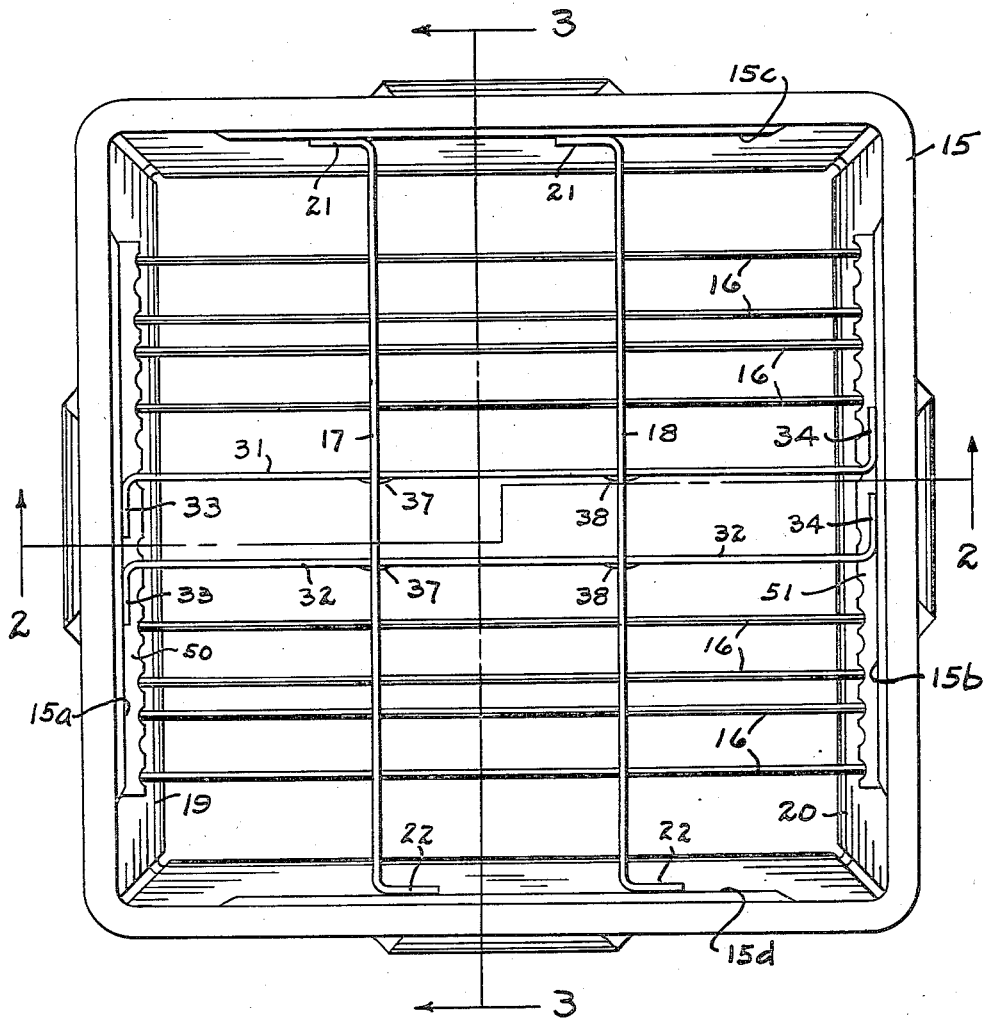
Fig. 1 is a view in top plan view of a structure embodying the invention.

The invention is embodied in a structure which is made entirely out of metal and has the rectangular side wall generally designated by the numeral 15. The wall 15 which is essentially continuous around the crate, is entirely open at the bottom and top ends. The specific construction of this wall 15 does not enter into the invention per se, and therefore is not herein described in detail apart from the form as shown in the drawings. A supporting structure for holding bottles and containers within the wall 15 is herein shown as consisting of a plurality of wires or bars 16 extending across the lower ends of the wall sides 15a and 15b. These rods 16, herein shown as eight in number, are actually carried by the two partition members 17 and 18 by extending therethrough, to have their outer ends resting on in-turned ledges 19 and 20 extending inwardly from the lower ends of the wall portions 15a and 15b.

The partition members 17 and 18 are identical in size and shape and design, one of these partitions, partition 17, being illustrated in Fig. 4. The partition 17, a description of which will suffice also for a description of partition 18, has oppositely turned end legs 21 and 22, Fig. 1, and the over all height of the partition in each instance is at least substantially half the height of the wall 15, Fig. 2. The lower edge portion of the partition 17 is folded over to give a double thickness, designated by the numeral 23, and this double thickness is perforated by a plurality of holes 24, Fig. 4, and through these holes the rods 16 are passed. The spacing apart of the rods 16 may be determined by the spacing apart of these holes, and where that spacing is variable for different customers, there will be more holes 24 provided as in Fig. 4 as well as in Fig. 3, than there are rods 16 employed. In the present showing, the centermost of the rods 16 in each of two groupings are closer together than is the spacing between those centermost rods and the outermost ones. This particular spacing is immaterial to the invention per se.

The partition 17, Fig. 4, is punched through to give a pair of elongated vertically disposed slots 25 and 26 respectively, the upper ends of these slots being widened at the top and bottom ends thereof. The slot 25 has the slot enlarged to give the opening 27 at the upper end on one side of the slot 25 and the opening 28 extending beyond the slot 25 at the lower end. Likewise the slot 26 has its upper end widened to the right of the slot 26 by the widened opening 29 and at the lower end by the widened opening 30 extending to the left hand side. In effect, these slots 25 and 26 thus formed are roughly elongated S-shaped. However the slots and the top and bottom openings are essentially rectangular in shape.

A pair of cross partitions 31 and 32 are provided and these cross partitions are less in height than are the partitions 17 and 18. One of these partitions, partition 31 is illustrated in Figs. 5 and 6 and a description thereof will suffice to describe the identical shape and size partition 32. This partition 31 is a strip of metal having oppositely turned ends forming feet 33 and 34. In order to stiffen the partition 31, the upper and lower ends are rolled over in opposite directions to form the double thickness portions 35 and 36.

At equi-distant positions from the respective end feet 33 and 34, and spaced one from the other, are pressed from the central area of the partition 31, "dimples" or sections of spherical surfaces designated by the numerals 37 and 38 respectively. Each of these dimples 37 and 38 is vertically slotted as at 39 and 40. The width of these slots 39 and 40 slightly exceed the thickness of the partitions 17 and 18 between their lower folded ends 23 and the upper overfolded edges 41.

The two cross partitions 31 and 32 are so designed as to be carried one each through the slots 25 and 26 to have the edges of the slots 39 and 40 interengage opposite faces of the partitions 17 and 18. Reference to Figs. 7–10 will indicate how this is accomplished.

Referring to Fig. 7, a partition 17 has a partition 31 carried through the slot 25 in an angularly disposed approach as indicated by the dash lines, to carry the foot 33 through the slot 25. When the dimple 37 comes up to the slot 25, Fig. 8, the rounded surface thereof will strike the edge 42, whereupon the partition 17 will have to be forced along in the same direction as indicated by dash lines, causing the slot 25, edge 43 to bend somewhat, in order to permit the dimple half 44 to spring through the slot 25 and have the edge 45 come into abutment with the side of the partition 31 toward which the dimple 37 has been approaching whereupon the interconnection will assume that relationship as indicated in Fig. 10 where the edge 44 of the slot 39 is on the one side of the partition 31 and the edge 45 is on the other side. Thus the edge 42 of the slot 25 actually extends inwardly of the dimple 37 whereupon there is a positive interlock between the two partitions preventing further relative longitudinal travel. The second partition 32 is likewise assembled with the partition 17.

Thereafter, the partition 18 is relatively brought over the feet 34 of the partitions 31 and 32 and moved upwardly by the partitions 31 and 32 sliding through the slots 25 and 26 in the same manner as above described until there is the interlocking engagement between the partitions 31 and 32 and the major height partition 18.

Figure 2:
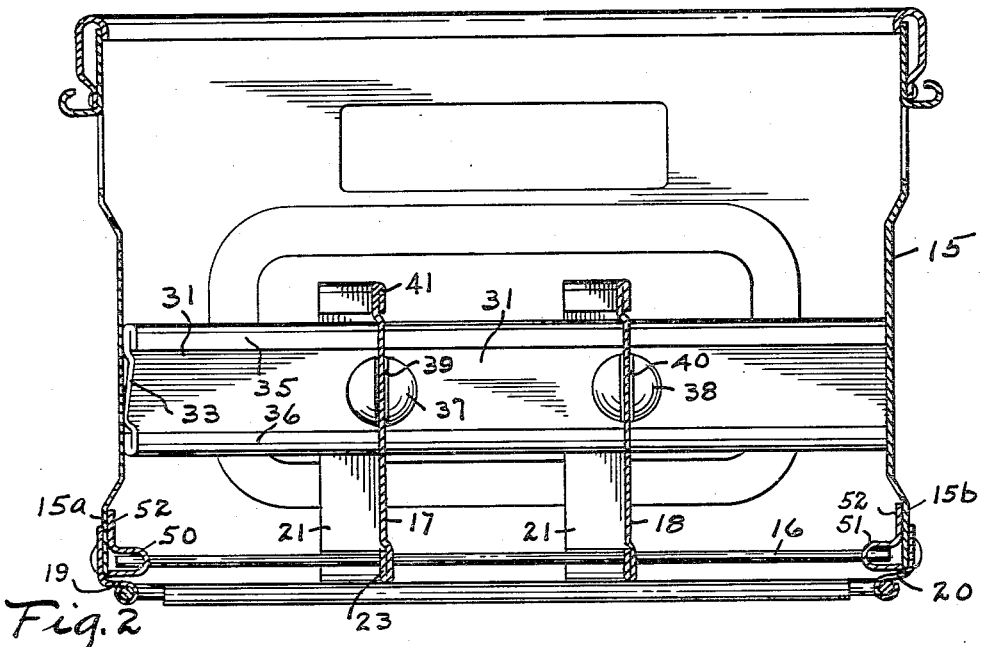
Fig. 2 is a view in vertical transverse section on the line 2—2 in Fig. 1.
Figure 3:
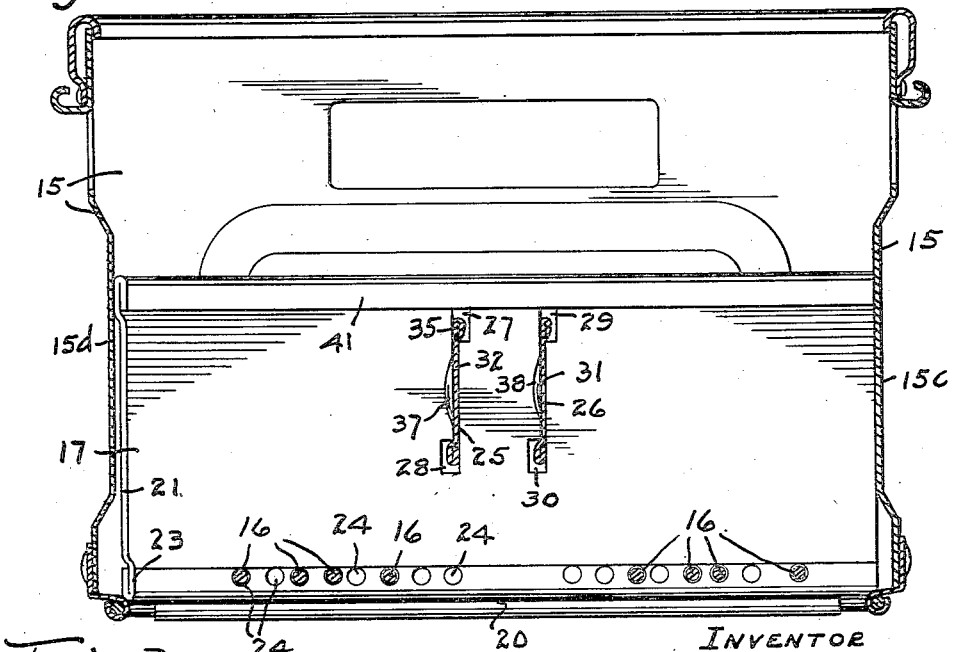
Fig. 3 is a vertical, transverse section through the milk crate on the line 3—3 in Fig. 1.

The rods 16 are then inserted through the lower folds 23 of each of the partitions 17 and 18, and over the ends of the rods there are positioned respectively U-shaped channels 50 and 51, Figs. 1 and 2, to have the legs of the channels in each instance turned outwardly away from the partitions 17 and 18, each of these channels 50 and 51 being provided with an upturned leg 52. The assembly thus produced is then ready to be slipped downwardly within the wall 15. The feet 33 of the partitions 31 and 32 come into abutment with the opposite walls 15a and 15b and the feet 21 and 22 of the partitions 17 and 18 come into abutment with the inside faces of the walls 15c and 15d respectively. The flanges 52 of the channels 50 and 51 are brought up against the side walls 15a and 15b and secured thereto in any suitable manner either by welding or by riveting as may be desired. Likewise the respective feet 21, 22, and 33, 34, are secured to their respective walls by any suitable means such as by riveting or by welding.

Thus the four partitions intersecting one another are not only spaced apart at the proper relationship to receive the containers (not shown) between them, but they are secured in position by their ends and are also securely interlocked at their cross intersections. It is to be noted that the slots 25 and 26 are spaced one apart from the other a slight distance so that there is a clearance for safety to permit not only easy grasping of the containers to be held on each side of the two partitions 31 and 32, but also to prevent accidental contact thereacross. Furthermore, by use of the two partitions 31 and 32, there is a very rigid bracing of the partitions 17 and 18 as well as of the partitions 31 and 32 so that there is no bending out of shape of these various partitions between the various sides of the wall 15.

In the foregoing description, it was initially mentioned that the rods 16 are supported on the in-turned flanges 19 and 20, and this is done indirectly by reason of the channels 50 and 51 being substantially in contact therewith.

Therefore while we have herein shown and described our invention in the one particular form, it is obvious that structural variations may be employed without departing from the spirit of the invention, and we therefore do not desire to be limited to that precise form beyond the limitations which may be imposed by the following claims.

We claim:

1. In a crate having a surrounding side wall, compartmentalizing means comprising intersecting compartment partitions, one partition having a vertical slot therethrough intermediate its top and bottom edges, the slot terminating in closed ends respectively spaced from said edges, said slot having opposing vertical edges confined within the plane of said one partition; a second partition having a height slightly less than that of said slot; a protrusion extending from a side of the second partition; said protrusion being vertically slotted from its outside back to the side of the partition from which it bulges; said second partition extending through said one partition slot with one face bearing against one edge of said slot and receiving the opposite edge of that slot within the slot across said protrusion and therebeyond along the other face of said one partition; ends of said partition being fixed to said surrounding wall; said protrusion being dome-like and limited in outward bulging for half of its passage through said one partition slot by springing said opposite edge of the slot out of said plane and having that opposite edge spring back into said slot and back into said plane.

2. The structure of claim 1 in which said protrusion is located approximately midway between the top and bottom edges of said second partition, and said slot through the protrusion is located centrally thereof.

References Cited in the file of this patent

UNITED STATES PATENTS

| 988,062 | Armstrong et al. | Mar. 28, 1911 |
| 1,010,772 | Klenk | Dec. 5, 1911 |
| 1,101,745 | Jones | June 30, 1914 |
| 1,197,506 | Le Doyen | Sept. 5, 1916 |
| 1,697,003 | Fink | Jan. 1, 1929 |
| 2,082,667 | Vanderveld | June 1, 1937 |

FOREIGN PATENTS

| 471,066 | France | July 1, 1914 |